(12) United States Patent
Chaki et al.

(10) Patent No.: US 10,244,379 B2
(45) Date of Patent: Mar. 26, 2019

(54) SCHEDULED GROUP REFORMATION AMONG MULTIPLE P2P GROUPS FOLLOWING SWITCHING SCHEDULE

(71) Applicant: NEC Corporation, Tokyo (JP)

(72) Inventors: Prakash Chaki, Tokyo (JP); Masato Yasuda, Tokyo (JP); Kazuaki Nakajima, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/573,659

(22) PCT Filed: May 20, 2015

(86) PCT No.: PCT/JP2015/002529
§ 371 (c)(1),
(2) Date: Nov. 13, 2017

(87) PCT Pub. No.: WO2016/185507
PCT Pub. Date: Nov. 24, 2016

(65) Prior Publication Data
US 2018/0098208 A1    Apr. 5, 2018

(51) Int. Cl.
*H04W 8/00* (2009.01)
*H04W 72/12* (2009.01)
(Continued)

(52) U.S. Cl.
CPC ......... *H04W 8/005* (2013.01); *H04W 28/021* (2013.01); *H04W 72/121* (2013.01);
(Continued)

(58) Field of Classification Search
CPC ..... H04W 8/005; H04W 76/11; H04W 76/14; H04W 28/021; H04W 72/121; H04W 84/18
See application file for complete search history.

(56) References Cited

U.S. PATENT DOCUMENTS 7,512,146 B1 * 3/2009 Sivasankaran .......... H04L 12/18
370/252
8,179,785 B1 * 5/2012 Newman ............. H04L 41/0627
370/217
(Continued)

FOREIGN PATENT DOCUMENTS

JP    2005-204319 A    7/2005
JP    2014-183340 A    9/2014

OTHER PUBLICATIONS

International Search Report, Corresponding to PCT/JP2015/002529, dated Feb. 16, 2016, 2 pp.
(Continued)

*Primary Examiner* — Dominic E Rego
(74) *Attorney, Agent, or Firm* — Wilmer Cutler Pickering Hale and Dorr LLP

(57) ABSTRACT

A method includes: performing a scan to discover at least one Peer to Peer (P2P) group; sharing a result of the scan within a first P2P group; preparing a switching schedule of the first P2P group based on the shared result; wherein the switching schedule enables a switching device to disconnect from a first owner device in the first P2P group and to connect with a second owner device in a second P2P group; sharing an information with the second P2P group by using the switching device; and performing communication among the first P2P group and the second P2P group on the basis of the information.

19 Claims, 14 Drawing Sheets

(51) Int. Cl.
  *H04W 76/14* (2018.01)
  *H04W 76/11* (2018.01)
  *H04W 28/02* (2009.01)
  *H04W 84/18* (2009.01)

(52) U.S. Cl.
  CPC ............ *H04W 76/11* (2018.02); *H04W 76/14* (2018.02); *H04W 84/18* (2013.01)

(56) References Cited

U.S. PATENT DOCUMENTS

| | | |
|---|---|---|
| 2011/0282989 A1 | 11/2011 | Geirhofer et al. |
| 2012/0271912 A1* | 10/2012 | Cho .................... H04L 61/2015 709/217 |
| 2014/0206407 A1 | 7/2014 | Kim et al. |
| 2015/0195699 A1* | 7/2015 | Naka ..................... H04W 76/14 370/338 |
| 2015/0264123 A1* | 9/2015 | Smadi ..................... H04W 4/12 709/206 |

OTHER PUBLICATIONS

Japanese Notification of Reasons for Refusal issued in Japanese Patent Application No. 2017-557478, dated Sep. 18, 2018 (7 pages).

\* cited by examiner

Fig.3

SWITCHING SCHEDULE
203(a)

| GROUP ID | | | |
|---|---|---|---|
| SWITCHING NODE ID | DESTINATION GROUP ID | DEPARTURE TIME | ARRIVAL TIME |
| NODE ID1 | GROUP ID1 | T1 | T3 |
| NODE ID2 | GROUP ID2 | T2 | T4 |
| ⋮ | ⋮ | ⋮ | ⋮ |

Fig.4

SWITCHING SCHEDULE
203(b)

| GROUP ID | | |
|---|---|---|
| SWITCHING NODE ID | DESTINATION GROUP ID | SWITCHING FREQUENCY |
| NODE ID1 | GROUP ID1 | SF1 |
| NODE ID2 | GROUP ID2 | SF2 |
| ...... | ...... | ...... |

SCHEDULED GROUP REFORMATION AMONG MULTIPLE P2P GROUPS FOLLOWING SWITCHING SCHEDULE

CROSS-REFERENCE TO RELATED APPLICATIONS

The present application is a national stage application of International Application No. PCT/JP2015/002529 entitled "Scheduled Group Reformation Among Multiple P2P Groups Following Switching Schedule," filed on May 20, 2015, the disclosure of which is incorporated herein in its entirety by reference thereto.

TECHNICAL FIELD

This application generally relates to communication between devices. Particularly, this application relates to a method, an apparatus and system in wireless peer-to-peer (P2P) networks.

BACKGROUND

Wi-Fi Peer to Peer (P2P), also known as Wi-Fi Direct, is a recently released standard for device to device communication. Wi-Fi P2P allows devices to communicate with each other at exemplary Wi-Fi speed (at least 802.11 g) without requiring Internet connectivity. The point in which it differs from the traditional infrastructure mode of Wi-Fi is that it does not require a specialized hardware to act as Access Point (AP) for routing packets. According to the Wi-Fi Peer-To-Peer (P2P) Technical specification Version 1.4 (NPL 1), any Wi-Fi P2P Device is capable of playing the role of a P2P Group Owner (analogous to AP) or a P2P Client (analogous to STA (Non-AP Station)). Before starting data communication, Wi-Fi P2P Devices negotiate among themselves to decide the device that will play the role of P2P GO and create a group. The P2P GO can thereafter add more Wi-Fi P2P devices as P2P Client. Wi-Fi Direct standard makes it obligatory to create a group before starting data communication, and all communication between peers takes place within the group. The group operates in a star topology and all packets are routed through the P2P GO.

CITATION LIST

Non Patent Literature

[NPL 1]
Wi-Fi Peer-To-Peer (P2P) Technical specification Version 1.4

SUMMARY

Technical Problem

Wi-Fi Direct operates in a group structure, where one node assumes the role of the leader (called Group Owner or P2P GO in Wi-Fi P2P terminology) and other group members stay connected to the GO as P2P Clients. Peer to peer communication in Wi-Fi Direct is defined within the group. Content delivery to a large number of nodes in a wide area using Wi-Fi Direct is a technical challenge as communication outside the group is not possible using single physical/logical MAC (Media Access Control) entity. Thus a large gathering of Wi-Fi P2P devices would result into several isolated Wi-Fi P2P group formation. In such a multi-group Wi-Fi P2P network, it is a technical challenge for nodes in one Wi-Fi P2P group to discover another Wi-Fi P2P group located far away or share data with other groups. Not only these groups are isolated and disconnected, their operation is also asynchronous.

An object of certain exemplary embodiments is to solve foregoing problem and to provide a mechanism by which inter-group data communication is made possible in a distributed multi-group P2P network.

In addition to the object mentioned, other obvious and apparent advantages of the invention will be reflected from the detailed specification and drawings.

Solution to Problem

A method according to the exemplary embodiment comprises: performing a scan to discover at least one Peer to Peer (P2P) group; sharing a result of the scan within a first P2P group; preparing a switching schedule of the first P2P group based on the shared result; wherein the switching schedule enables a switching device to disconnect from a first owner device in the first P2P group and to connect with a second owner device in a second P2P group; sharing an information with the second P2P group by using the switching device; and performing communication among the first P2P group and the second P2P group on the basis of the information.

A system according to the exemplary embodiment comprises a first Peer to Peer (P2P) group; a second P2P group; a first owner device in the first P2P group; a second owner device in the second P2P group; and a switching device. The first owner device shares a result of a scan within the first P2P group, the scan being performed to discover at least one Peer to Peer (P2P) group. The first owner device prepares a switching schedule of the first P2P group based on the shared result, wherein the switching schedule enables the switching device to disconnect from the first owner device and to connect with the second owner device. The switching device shares an information with the second P2P group. Communications among the first P2P group and the second P2P group are performed on the basis of the information.

A first owner device according to the exemplary embodiment in a first Peer to Peer (P2P) group comprises a switching schedule that enables a switching device to disconnect from the first owner device and to connect with a second owner device in a second P2P group; a processor that shares a result of a scan which is performed to discover at least one P2P group within the first P2P group, and prepare the switching schedule of the first P2P group based on the shared result.

A switching device according to the exemplary embodiment comprises a processor that disconnects from a first owner device in the first Peer to Peer (P2P) group and connect with a second owner device in a second P2P group on the basis of a switching schedule prepared by the first owner device, wherein the processor shares an information with the second P2P group; a communication module that performs communications among the first P2P group and the second P2P group on the basis of the information.

A non-transitory computer readable medium, according to the exemplary embodiment, embodying instructions for controlling a device to implement a method comprising: disconnecting from a first owner device in a first Peer to Peer (P2P) group on the basis of a switching schedule prepared by the first owner device; connecting with a second owner device in a second P2P group on the basis of the switching schedule; sharing an information with the second P2P group;

and performing communications among the first P2P group and the second P2P group on the basis of the information.

Advantageous Effects of Invention

According to the exemplary embodiments, content delivery to a large number of nodes will be possible in an ad-hoc manner overcoming the group-size limitation of P2P network.

The invention accordingly comprises the several steps and the relation of one or more of such steps with respect to each of the others, and the apparatus embodying features of construction, combinations of elements and arrangement of parts that are adapted to affect such steps, all is exemplified in the following detailed disclosure, and the scope of the invention will be indicated in the claims.

BRIEF DESCRIPTION OF DRAWINGS

FIG. 3 is a schematic diagram showing an example of a switching schedule provided in a node according to an exemplary embodiment of the present invention.

FIG. 4 is a schematic diagram showing another example of a switching schedule provided in a node according to an exemplary embodiment of the present invention.

DESCRIPTION OF EMBODIMENTS

Figure 1:
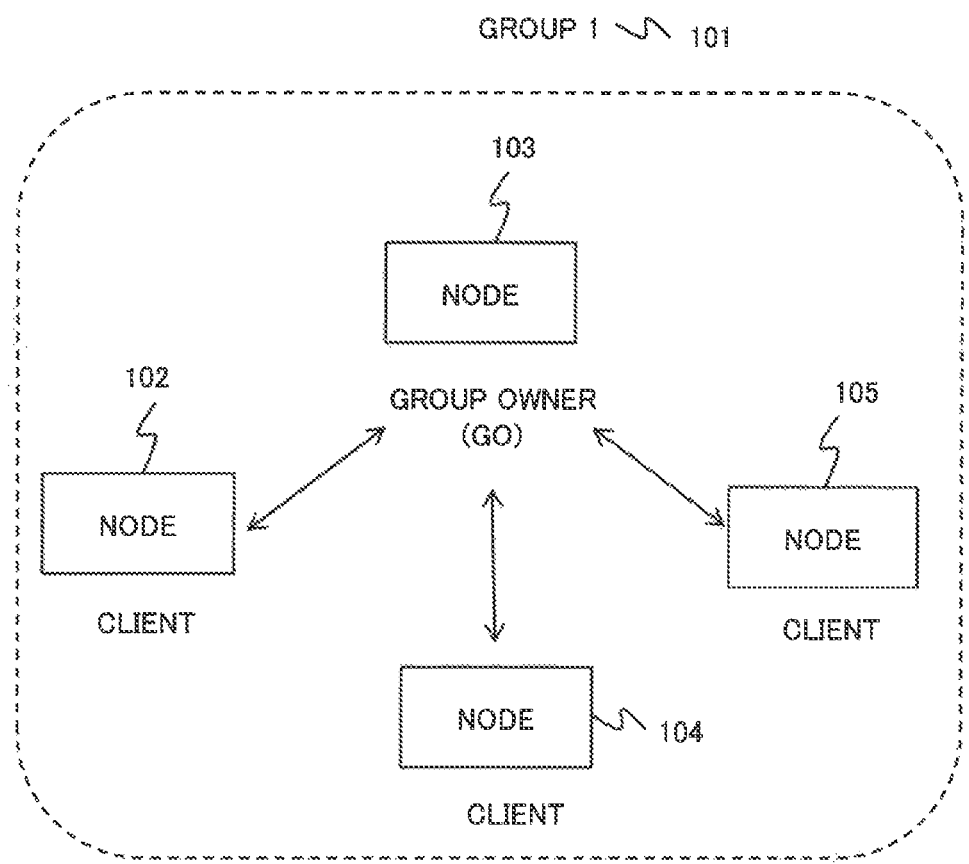
FIG. 1 is a schematic diagram showing a wireless peer-to-peer (P2P) group according to an exemplary embodiment of the present invention.

Hereinafter, the word "exemplary" is used herein to mean "serving as an example, instance, or illustration". Any embodiment described herein as "exemplary" is not necessarily to be construed as preferred or advantageous over other embodiments.

1. Outline of Exemplary Embodiments

Exemplary embodiments addresses the problems discussed above by using a mechanism of inter-group switching. The Peer to Peer (P2P) Group Owner (GO) of every group instructs its group members (including itself) to do iterative device discovery to find information about neighboring groups and report to the P2P GO. Based on the discovery result, the P2P GO assigns some or all of its clients to periodically disconnect from its incumbent group and join a neighboring group. More specifically, a P2P GO may prepare a switching schedule in which it discloses which client has to switch to which group, including the departure time and re-joining time or the frequency of switching. This switching schedule serves as an inter-group connection topology map along with the frequency (per unit time) of inter-group switching events in each of those inter-group connections. The switching assignment is delegated to clients by the GO following a mechanism that checks which neighboring group was discovered by which client depending on whether or not the neighboring GO is accepting any Delivery Node (DN). The mechanism of assigning the role of Delivery Node may also include checking the capabilities of a node to qualify as a Delivery Node. Along with that, at least one of the physical distance and received signal strengths between the client and a neighboring GO are also taken into account before assigning switching task. Thus, every GO prepares a switching schedule for its own group which is updated as and when required. The switching schedule along with other necessary group operation control messages are shared with the neighboring groups during switching events. Once the initial schedule is prepared, the corresponding client disconnects from the native GO, tries to connect with the neighboring GO as specified in schedule until a timeout following a random back-off mechanism. On successfully joining to the neighboring GO, it registers itself as a delivery node between that group and its native group and shares the switching schedule of itself and all other known groups and network topology map with that neighboring group. It also collects the switching schedules or topology map known to the visited group and shares it within its own group after rejoining its own group. A GO may restrict the number of delivery nodes registered to it by a maximum value. It accepts delivery node request till it reaches the upper limit.

In a wide area network, transmission range is an obvious problem. Thus it is highly likely that all groups may not be able to discover every other group. To avoid routing inefficiency in such cases, every group may share information like its list of discovered groups, operating channel, group member information and their corresponding switching schedules and topology map with other groups during switching events. Thus, even if a group is out of range for many other groups, it can still be discovered by means of switching as long as it is reachable by at least one other group. In addition, knowledge of its switching schedule can be used in route computation and scheduling a message transmission to that group.

The GO of every Wi-Fi P2P group may add additional information in Probe Request/Response or Beacon frame to indicate if it has vacant position for client or Delivery Node (DN). This will enable other GOs to know if it can initiate a DN-enabled-connection with that group. It will also let new Wi-Fi P2P nodes to find a GO with whom it can associate, simply by device discovery.

GO can distinguish between connection requests from normal clients and Delivery Node by making the Delivery Nodes to put their Group Identification Information (like BSSID) in their Probe Request/Response frames.

To meet sudden rise in traffic demands on some heavily congested routes, P2P GOs of the groups in those route may increase the switching frequency for Delivery Nodes, or even employ a higher number of Delivery Nodes for inter-group switching. Such load balancing mechanism will be performed by prior negotiation among the P2P GOs who will correspondingly update their switching schedule. The switching frequency and number of Delivery Nodes between a pair of Wi-Fi P2P groups can be reduced to default value when the traffic demand subsides. Thus the network traffic can be controlled by suitably varying number of Delivery Nodes and their switching frequency.

As described before, in order to solve the critical engineering problems, the exemplary embodiment discloses a mechanism of scheduled switching among groups. In a distributed network scenario including a large number of Wi-Fi P2P groups, all members in a group perform neighbor discovery iteratively. As and when a new neighboring GO is discovered, clients share the information within the group. Based on the results of neighbor discovery from the clients, the GO prepares a Switching Schedule which lays out the switching task delegated to each client. The mechanism used for assigning switching task considers parameters like received signal strength (RSS) of the neighboring GO at the particular client; thus among all the clients who discover a particular group (GO), the one with maximum RSS from that GO is delegated the task of switching to it. Assigning of switching task to a P2P Client may also be done by checking device capabilities of the client, like its residual power, CPU (Central Processing Unit) speed, primary memory size, transmission range, expected duration of stay in the group etc. Here, "switching task" implies disconnecting from incumbent (parent) group, connecting to the GO of a neighboring group for a stipulated time and rejoining the parent group. A number of backup nodes may also be selected by the P2P GO from its group members to take up the switching task for uninterrupted switching in case the node assigned with switching task quits from the network for an unexpected length of time. The said schedule may include information including but not limited to the switching nodes, the parent group, the neighboring group to be switched to, departure time from parent and rejoining (arrival) time to the parent group etc. It may also include the information of the switching frequency of a Delivery Node which entails the number of times it performs round-trip switching between its parent group and visiting group in per unit time. Once the switching schedule is shared within the group, the clients who are designated as Delivery Nodes disconnect from the parent group at the specified departure time. They send connection request to the specified neighboring GO, and in case of connection establishment failure they retry after a random back-off time similar to the CSMA (Carrier Sense Multiple Access) mechanism. For every failure, the Delivery Node may increase its contention window and choose a random time from it as its next retry instant.

Once connected for the first time, the switching node shares the information including but not limited to group ID, group member ID (MAC address), frequency of operation, security credentials, switching schedule of its parent group as well as all other groups discovered by (or known to) its parent group. It also collects similar information from the visited group and rejoins the parent group at the specified arrival time. In case of any delay by a switching node when it fails to abide by the time mentioned in the switching schedule, the switching schedule is updated by the GO with new timing.

After the 1st switching event, the GO of the visited group creates persistent group history with the DN(s) so as to ensure that the subsequent switching events are faster using invitation mechanism. All DNs in a group also create persistent group history with the neighboring GO assigned to it so that quick switching is possible. Even if the switching task to a particular group is changed from one client to another, the new switching node can also connect using invitation mechanism following the same method.

The switching task assignment may not be static. The P2P GO may decide to change the DN at a later time and assign the task to some other P2P Client depending on a variety of reasons including but not limited to (i) another P2P Client possessing higher capabilities (receiving higher RSS from the corresponding neighboring GO, higher residual power, higher device specifications like CPU speed, primary memory etc.) or (ii) incumbent DN decides to quit the group etc. The switching schedule is updated accordingly in such case. The metrics mentioned here may be used by the GO to select the most suited Delivery Node for connecting to a particular neighboring GO.

In order to enable real time traffic load balancing, the GO node of a Wi-Fi P2P group may assign higher number of switching nodes for one or more specific groups which are part of high traffic routes. Thus the switching schedule is adaptively updated based on traffic along all routes. The updated switching schedule is shared with other groups in the subsequent switching events.

The packets in the transmission queue of a sender node may be prioritized and sorted according to the time of switching events to a route corresponding to each packet's destination. This will lead to an efficient transmission scheduling exploiting the information of Switching Schedule.

Every GO may divide its total number of permissible client positions into two categories: [1] Client and [2] Delivery Node (DN). A GO will only accept connection request from a new P2P device until it fills up the 1st category. Every Wi-Fi P2P GO may announce its vacancy in Client and DN category in Probe Request/Response and Beacons. If a GO finds another GO in neighborhood which announces vacancy in DN category, then it will designate one of the clients as DN for that group. Once a client is assigned as DN, its category is changed from Client to DN and thus a vacancy is created in Client category which is announced in the subsequent Probe Requests/Response or Beacons. When a DN from one Wi-Fi P2P group switches to another Wi-Fi P2P group, it may always send a Probe Request/Response to the neighboring GO by including some information of its incumbent group (like BSSID (Basic Service Set Identifier)). This enables the other GO to distinguish between a new P2P device and a DN. When a DN from one Wi-Fi P2P group switches to another for the first time, it registers itself with the visiting GO as a DN between those two groups. Then both the GOs reduce the vacancy position of DN by one. Every GO shares the information of its current DN-enabled-connections with other groups (if any) and the switching schedules (of itself as well as those of others collected via DN) through the DN. This may be used for route-computation to a group which cannot be reached directly. Once a GO decides to stop DN-enabled-connection with another group, the DN may inform the other group prior about stopping its switching task. The corresponding pair of GO between whom the DN has been switching may then unregister the DN from their list of DN for that switching-based connection. A DN that stops "switching" activity may be re-designated as normal client. The number of normal clients and DN should sum up to the total number of permissible clients; however the number of each of the two categories may be adaptively varied.

GO of every Wi-Fi P2P group may add one bit flag in the Probe Request/Response or Beacon frames; a 0 may imply the GO cannot accept any more clients while a 1 may indicate that the GO is accepting connection request. Alternatively, the GO may also include more detail information like number of vacancy for Client position etc. in the Probe Request/Response or beacon frames. This will enable a client to know just by Device Discovery which GO in neighborhood is accepting connection request; thus reducing the time of joining a group. Similarly, a GO node may also advertise the vacancy positions of Delivery Nodes. This will enable the GO of another Wi-Fi Direct group operating in neighborhood to know that it can form a DN-enabled-connection with this group. Once two Wi-Fi P2P groups with vacancy in DN position find each other, they may send a DN to the other group or expect a DN from the other group. The DN specifies the parent group information (like BSSID of parent group) in its Probe Request/Response so that other group may know its parent group and can distinguish it from another connection request from a new Wi-Fi P2P device. Without this method, a GO with maximum number of clients might reject connection request from a DN too. Every Wi-Fi P2P device, after being switched on, may perform active scanning and send connection request to a GO which announces a non-zero vacancy flag for Client category. Thus it can reduce the network joining time as otherwise it would have to send connection request to each of the discovered GOs one after another till it finds a GO which offers a vacant position in client category. In this way, we can realize a large distributed network with multiple Wi-Fi Direct groups enabling easier network joining procedure and smooth information flow across the groups.

According to the present invention, content delivery to a large number of nodes will be possible in an ad-hoc manner overcoming the group-size limitation of Wi-Fi Direct. Specifically, by making switching schedules in each Wi-Fi Direct group and sharing it across multiple groups, switching events will become deterministic and can be known beforehand. Since route availability in a network with dynamic topology reformation changes with time, so zero prior-knowledge of availability of routes implies all packets in a transmission queue are transmitted in a random order or in the "First In First Out" (FIFO) order. The exemplary embodiment uses sharing of switching schedule across multiple groups. Such prior knowledge of switching schedules including the switching frequency will help in scheduling the transmission of a packet and constructing efficient routing table. Also, prior knowledge of switching events lets the sender node know the switching node for the destination group, thus avoiding unnecessary flooding of data. Such a sharing of switching schedule will essentially serve as a topology map which will depict which pair of group is connected by Delivery Nodes along with the corresponding switching frequency.

In addition, sharing of information about all discovered groups by every group will ensure that every group knows a route to all other groups even if they lie outside each other's transmission range. Also, defining the "number of allowable delivery nodes" that a GO can support in the probe response/beacon will allow the other groups operating in neighborhood to know if switching is possible with that group. Furthermore, switching delay will be reduced when every GO prepares artificial persistent session history for all Delivery Nodes so as to ensure that they can connect by invitation. Our mechanism also includes the provision of the GO specifying in its Probe Request/Response or Beacon whether it is capable of accepting new clients or Delivery Nodes; thus allowing a new P2P device to know just by device discovery if it is possible to connect to a specific GO. This method reduces the time required for a new device to join the network as it sends connection request to a GO which advertises vacancy. Also, the Delivery Nodes carry the Group ID Information (like BSSID) in probe request/response to let a GO distinguish between a new P2P device and a Delivery Node. Finally, by suitably varying the number of Delivery Nodes and their switching frequency between a pair of Wi-Fi P2P groups, high network traffic can be handled in a multi-group Wi-Fi P2P network.

2. Exemplary Embodiment

Hereinafter, exemplary embodiments of the present invention will be described according to Wi-Fi Direct Standard as an example. The exemplary embodiment is discussed in its complete details with accompanying figures and finally explained with a typical example scenario.

2.1 System Configuration

As illustrated in FIG. 1, four nodes form an exemplary Wi-Fi Direct group 101. In the group 101, the node 103 operates as a Group Owner (GO) and other nodes 102, 104, 105 operate as associated Clients, respectively. Once the group 101 is formed, the GO node 103 plays a role analogous to that of an access point in a Wi-Fi infrastructure mode operation. The GO 103 keeps a list of backup leader nodes and security credentials shared within the group prior so that the group does not get disrupted in case the GO leaves. All client nodes prepare virtual persistent group history with the backup leader nodes and quickly reconnect to a backup leader using invitation in case of sudden disruption.

Figure 2:
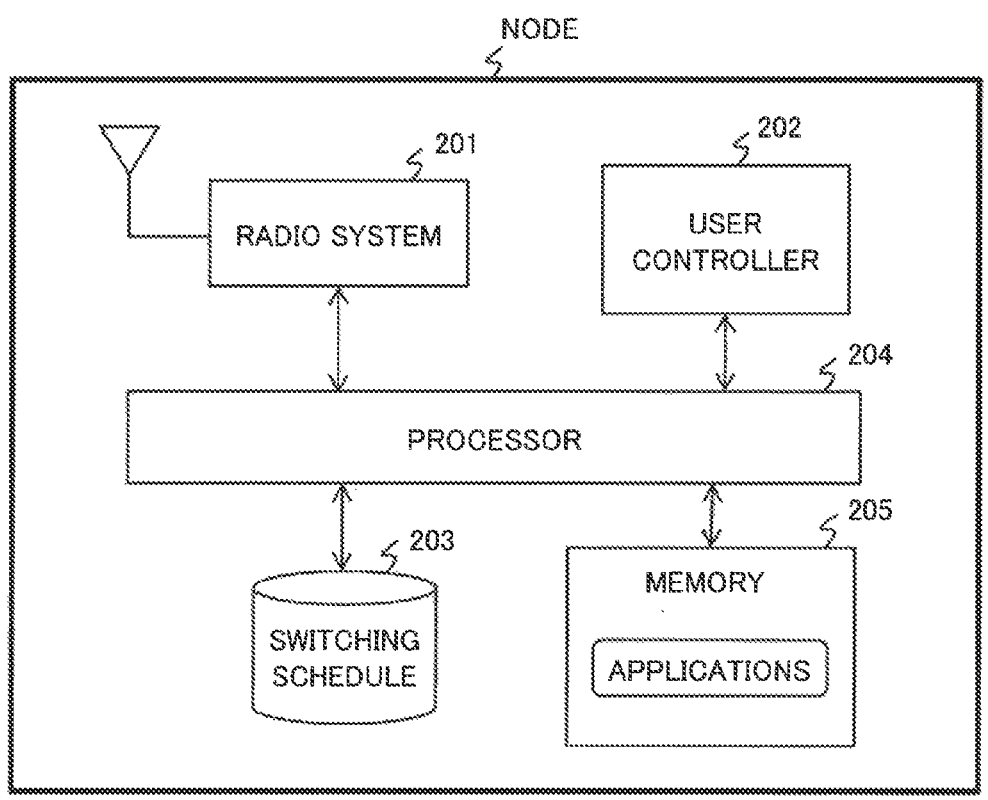
FIG. 2 is a block diagram showing the functional configuration of a node according to an exemplary embodiment of the present invention.

Referring to FIG. 2, the nodes 102-105 have the same configuration but may operate as GO or Client. The node includes the following functionalities: a radio system 201, a user controller 202, a switching schedule 203, a processor 204, and a memory 205. The radio system 201 includes a Wi-Fi Direct communication function. The user controller 202 controls Wi-Fi Direct connection procedures such as Device Discovery, GO Negotiation, Provisional Service Discovery and Invitation Mechanism etc. The Switching Schedule 203 includes the list of switching nodes (switching devices), the neighboring groups to which they are assigned to switch, the time of departure from current group, the time of return to the current group. The processor 204 can execute the operating system and applications stored in the memory 205 according to the present embodiment. The switching schedule 203 may be included in the memory 205 or a separate storage device such as a semiconductor memory.

FIG. 3 shows an example of an exemplary switching schedule 203(a) of a given Wi-Fi Direct Group. The switching schedule 203(a) includes at least one of information of the Group ID (ID of the group whose GO generated it), switching node ID, corresponding destination group to which the node will switch, departure time from parent group and return time to parent group. For example, the switching node ID1 switches to the destination group ID1. The switching node departs at the departure time T1 and return at the arrival time T3.

FIG. 4 shows another example of an exemplary switching schedule 203(b) of a given Wi-Fi Direct Group. The switching schedule includes at least one of information of the Group ID (ID of the group whose GO generated it), switching node ID, corresponding destination group to which the node will switch and switching frequency.

Figure 5:
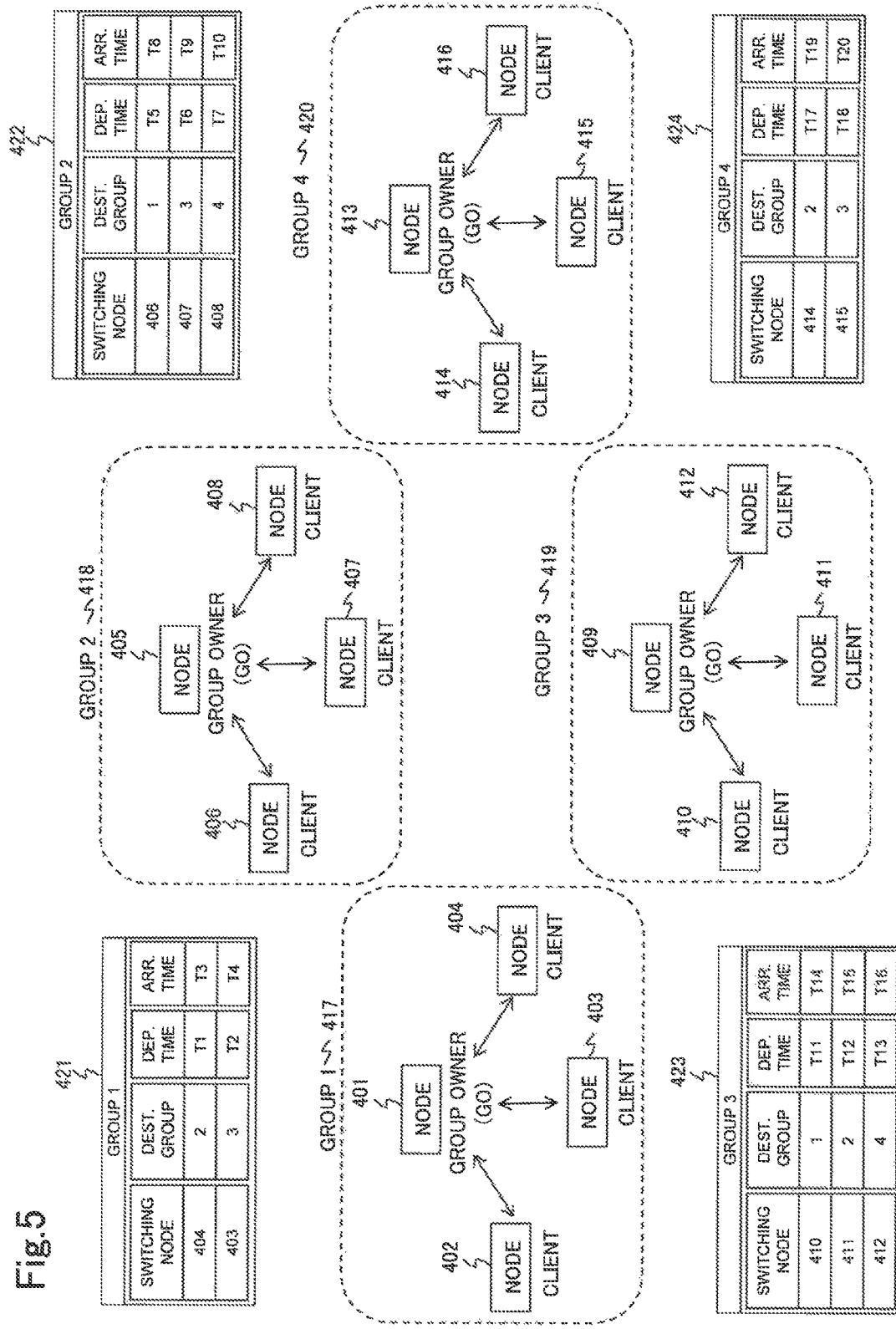
FIG. 5 is a schematic diagram showing four Wi-Fi P2P groups and their corresponding switching schedules according to an exemplary embodiment of the present invention.

FIG. 5 shows four exemplary Wi-Fi Direct groups 417-420 operating in neighborhood. The Group 1 includes one Group Owner 401 and three clients 402-404 associated to Group Owner 401. The Group 2 includes one Group Owner 405 and three clients 406-408 associated to Group Owner 405. The Group 3 includes one Group Owner 409 and three clients 410-412 associated to Group Owner 409. The Group 4 includes one Group Owner 413 and three clients 414-416 associated to Group Owner 413. Here, it is assumed that Group 1, 2 and 3 are in each other's transmission range, while Group 2, 3 and 4 are in each other's transmission range. In this case, Group 1 and 4 cannot find each other directly. Nodes in every group perform periodic device discovery so as to discover any GO operating in neighborhood. The device discovery results are shared within the group. For example, both node 404 and 403 can discover the neighboring GO 405 and 409. The received signal strength (RSS) of GO 405 is higher at the Node 404, while the RSS of 409 is higher at the Node 403. The GO 401 of Group 1 (417) assigns the switching task for Group 2 (418) to node 404 and the switching task for Group 3 (419) to node 403. The GO 401 prepares a switching schedule for its group specifying the departure time and rejoining time for the switching nodes. Alternatively, in another exemplary embodiment, multiple switching nodes may be assigned to switch to the same neighboring group. At their specified departure time, the designated switching nodes 404 and 403 disconnect from the parent group and connect to the assigned neighboring GO 405 and 409, respectively. The switching nodes 404 (for Group 2) and 403 (for group3) share the information (Group ID, Group member MAC addresses, operating channel, security credentials and switching schedule) of their parent group as well as other groups discovered by (or known to) their parent group with the neighboring group. The switching nodes 404 and 403 may collect similar information available at the visited GO 405 and 409 and rejoin the parent GO 401 at their respective arrival time T3 and T4. The collected information is shared within the parent Group 1 (417).

In the example explained using FIG. 5, node 408 of Group 2 (418) is assigned with the task of switching to Group 4 (420) following the same mechanism as explained above. The node 408 shares not only the information of Group 2 (418), but also the information of Group 1 (417) within the Group 4 (420). Similarly, node 408 may bring similar information from Group 4 (420) to Group 2 (418) which gets shared with Group 1 (417) in the subsequent switching events. Thus Group 1 comes to know about Group 4 and vice versa although they cannot find each other directly. Once the switching schedules 203 are shared, they can choose the most suitable route and schedule their packet transmission.

Figure 6:
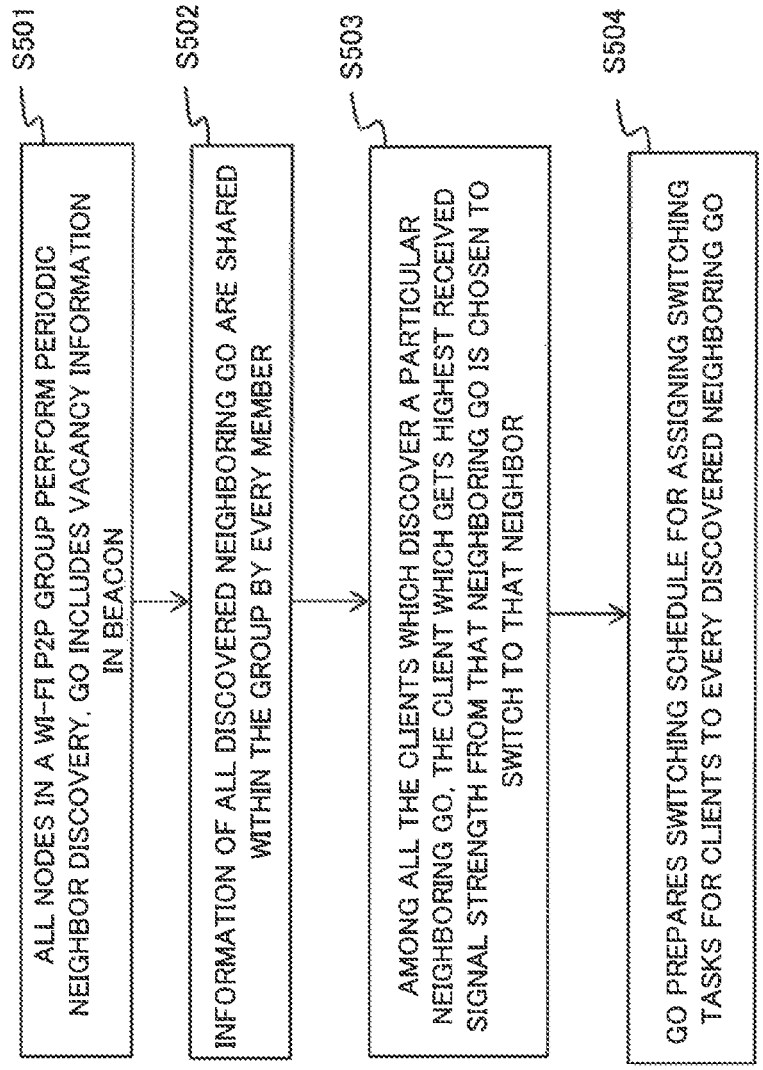
FIG. 6 is a flowchart showing the steps of constructing switching schedule according to the exemplary embodiment of the present invention.

FIG. 6 shows a flowchart for the construction of Switching Schedule of a Wi-Fi P2P group by the GO node. This is explained with an example of Group 1 in FIG. 5. In operation S501, all nodes 402-404 in a Wi-Fi P2P Group 1 perform periodic neighbor discovery. The nodes 402-404 can include vacancy information in Beacon. In operation S502, information of all discovered neighboring GO 401 are shared within the Group 1 by every node. In operation S503, among the client 403 or 404 which discover a particular neighbor GO 405 or 409, the client 403 or 404 which gets highest received signal strength from the neighboring GO 405 or 409 is chosen to switch to that neighbor GO. For example in FIG. 5, the GO 405 is chosen for the client 404, while the GO 409 is chosen for the client 403. In operation S504, the GO 401 prepares switching schedule for assigning a switching task for clients 403 or 404 to every discovered neighboring GO 405 or 409. Specifically, based on the results of neighbor discovery, the Group Owner 401 assigns switching task which is laid out in the switching schedule.

Figure 7:
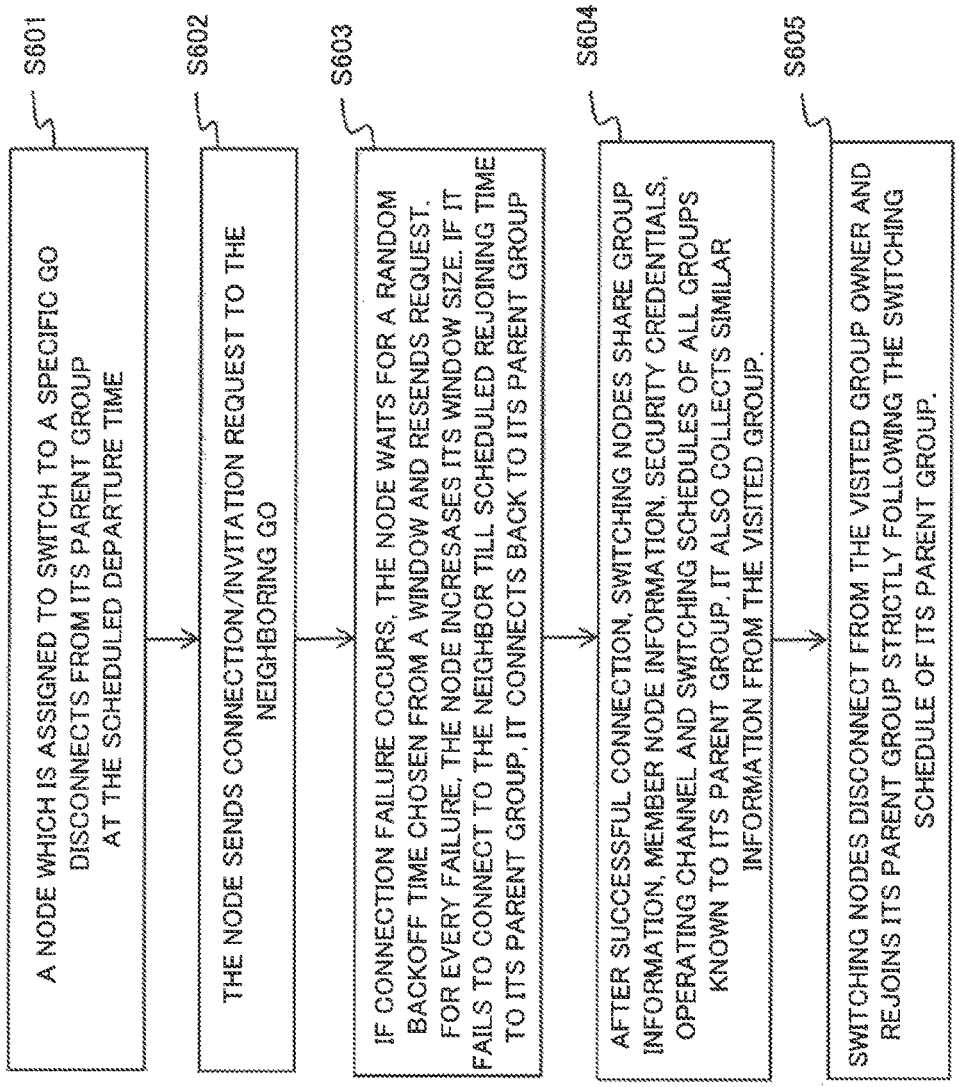
FIG. 7 is a flowchart showing a switching mechanism from one Wi-Fi P2P group to another according to the exemplary embodiment of the present invention.

FIG. 7 shows a flowchart for the mechanism of switching from one Wi-Fi P2P group to another as describes above. This is explained with an example of Group 1 in FIG. 5. In operation S601, a node 403 or 404 which is assigned to switch to a specific GO 405 or 409 disconnects from the parent Group 1 (417) at the scheduled departure time T1 or T2. In operation S602, the node 403 or 404 sends connection request or invitation request to the specified neighboring GO 405 or 409. In operation S603, in case of connection failure due to some ongoing connection process at the GO 405 or 409, the switching node 403 or 404 selects a random backoff time from a window and resends connection request after waiting for that interval. For every failure, the switching node 403 or 404 increases the window size. If it fails to connect to the neighbor GO 405 or 409 by the scheduled rejoining time T3 or T4 to the parent Group 1 (417), the switching node 403 or 404 connects back to the parent Group 1 (417). In operation S604, after successful connection, the switching node 403 or 404 shares at least one of group information, member node information, security credentials, operating channel and switching schedules of at least one of Groups known to the parent Group 1. The switching node 403 or 404 can collect similar information from the visited Group 2 (418) or Group 3 (419). For example, after a successful 1st time switching event, the group information, member information, security credentials and switching schedules are exchanged between the Group 1 and Group 2 or between Group 1 and Group 3. In addition, the GO may create persistent group history with the switching nodes of discovered neighboring group; and the switching nodes of all groups may also create persistent group history with the at least one GO of discovered neighboring groups. Thus, this allows that future switching events can be performed by employing invitation mechanism, reducing switching delay. In operation S605, the switching nodes 403 or 404 disconnect from the visited GO 405 or 409 and rejoin the Group 1 strictly following the switching schedule of the parent Group 1.

Figure 8:
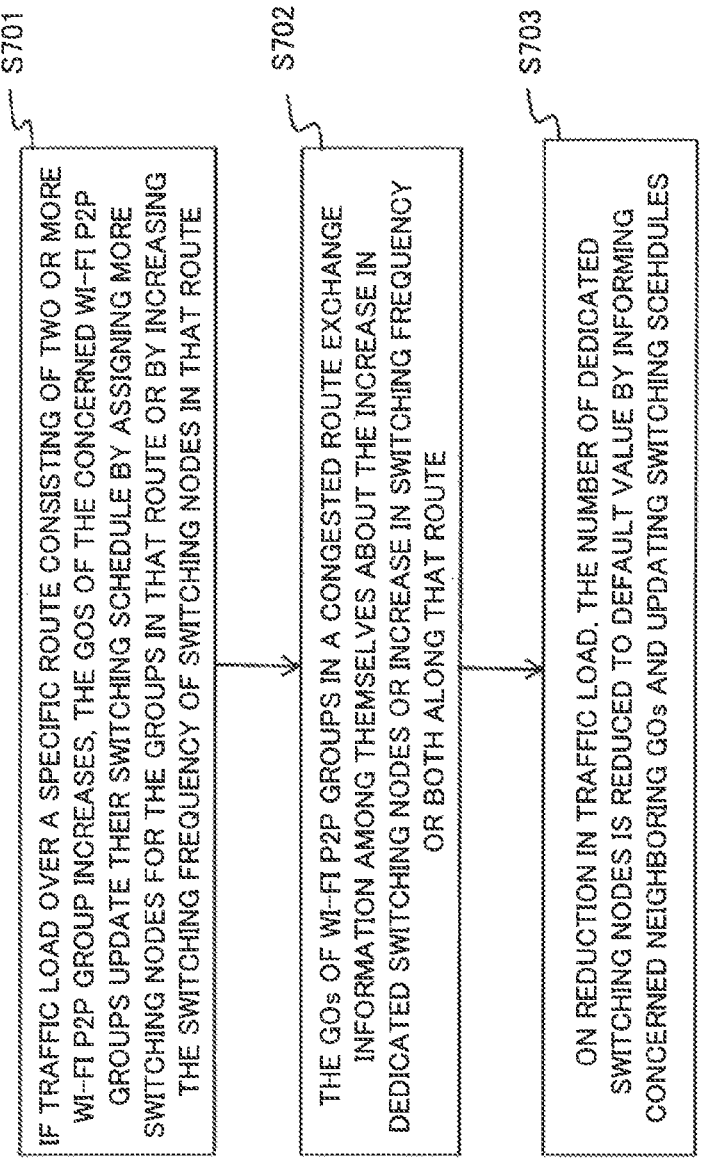
FIG. 8 is a flowchart showing the mechanism of adaptive load balancing according to the exemplary embodiment of the present invention.

FIG. 8 shows a flowchart for the mechanism of adaptive load balancing. In operation S701, if traffic load over a specific route consisting of two or more Wi-Fi P2P Groups increases, the GOs of the concerned Wi-Fi P2P Group update the switching schedule by assigning more switching nodes for the Groups in that route or by increasing the switching frequency of switching nodes in that route. Alternatively, the GOs of the concerned Wi-Fi P2P Group may update the switching schedule by both assigning more switching nodes for the Groups in that route and by increasing the switching frequency of switching nodes in that route. For example, if the switching frequency of one node reaches a maximum, the GOs may adjust the combination of the switching frequency per one node and the number of the switching nodes. In operation S702, the GOs of Wi-Fi P2P Groups in a congested route exchange information among themselves about the increase in dedicated switching nodes or the increase in switching frequency or both along that route. In operation S703, on reduction in traffic load, the number of dedicated switching nodes is reduced to default value by informing concerned neighboring GOs and updating switching schedules. As described above, the adaptive load balancing may be executed by adaptively increasing the number of Delivery Nodes between a pair of Wi-Fi P2P groups or increasing the switching frequency of a Delivery Node or both to support high traffic requirement at the mutual consent of both the concerned GOs between which the switching will take place. On reduction of the traffic load, the number of delivery nodes can be reduced to the default value.

Figure 9:
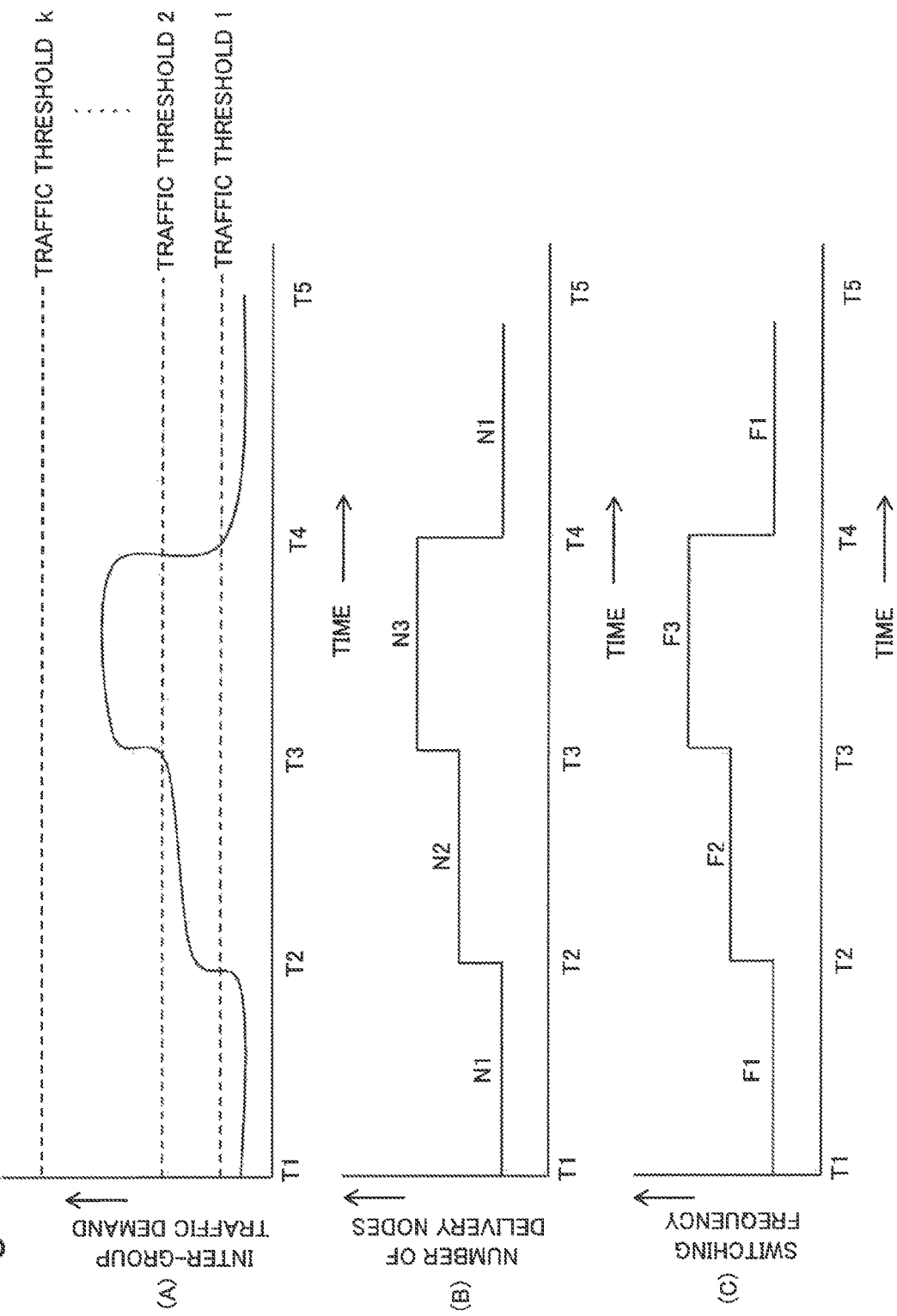
FIG. 9 is a graphical representation of adaptive load balancing according to the exemplary embodiment of the present invention.

FIG. 9 shows a graphical representation of adaptive load balancing. (A) shows an exemplary variation of traffic between a pair of Wi-Fi P2P groups. There can be one or more thresholds for comparing the level of traffic depending on which either (B) or (C) or both may be triggered to happen. (B) shows an adaptive increase in number of Delivery Nodes corresponding to an increase in inter-group traffic in (A). The traffic thresholds in (A) are set into k level. Traffic between time instant T1 and T2 is less than the Traffic Threshold 1. As a result, the number of Delivery Nodes is set to a minimum default value of N1 with corresponding switching frequency F1. Traffic between T2 and T3 exceeds Traffic Threshold 1 but is still less than Traffic Threshold 2. Correspondingly, the number of Delivery Nodes is increased to N2 in (B) to support this increased traffic requirement. The switching frequency of the Delivery Node(s) may also be increased to F2 as shown in (C). Traffic between T3 and T4 increases further and the number of Delivery Nodes and/or switching frequency of Delivery Nodes are also increased. When traffic demand falls below the Traffic Threshold 1 in between T4 and T5, the number of Delivery Nodes and/or the corresponding switching frequency is also reduced to the minimum default value of N1 and F1 respectively. Following this mechanism, either (B) or (C) or both may be adopted in response to a variation in traffic between a pair of Wi-Fi P2P groups.

Figure 10:
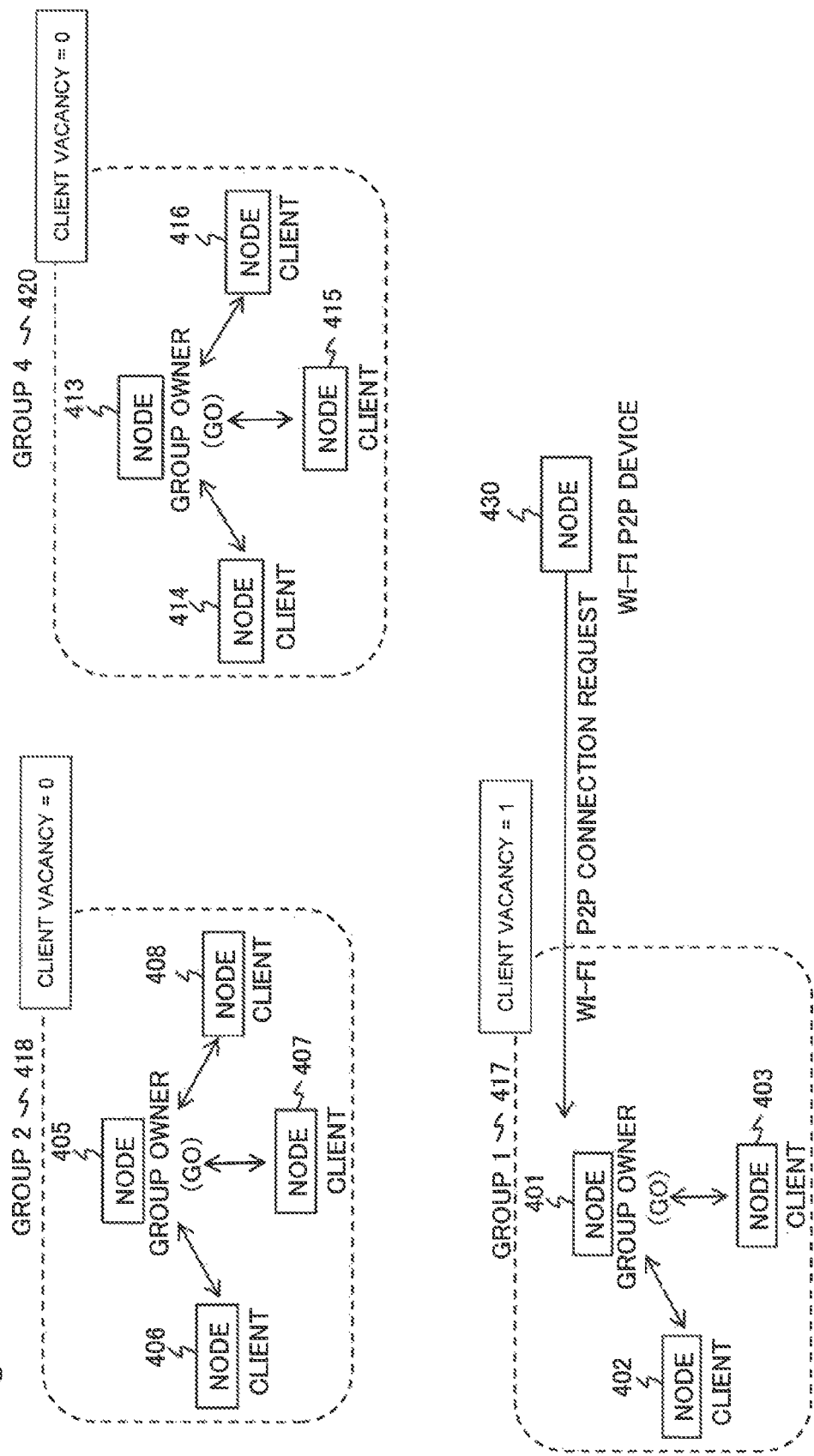
FIG. 10 is a schematic diagram showing the mechanism of joining the network for a new Wi-Fi P2P device according to the exemplary embodiment of the present invention.

FIG. 10 shows a schematic for the mechanism of joining the network for a new Wi-Fi P2P device. The device performs device discovery to find the Probe Request/Response or Beacon frame of the active GOs. Among all the discovered GOs, the device selects a GO which advertises a non-zero Client Vacancy and sends connection request to that GO. Thus the method helps in finding the suitable GO just by performing device discovery. For example, the node 430 (new Wi-Fi P2P device) performs the device discovery to find active GOs (GO 405 in Group 2, GO 413 in Group 4, GO 417 in Group 1). The node 430 selects GO 401 in Group 1 which advertises one vacancy in Client category. The node 430 sends a Wi-Fi P2P connection request to the GO 401.

Figure 11:
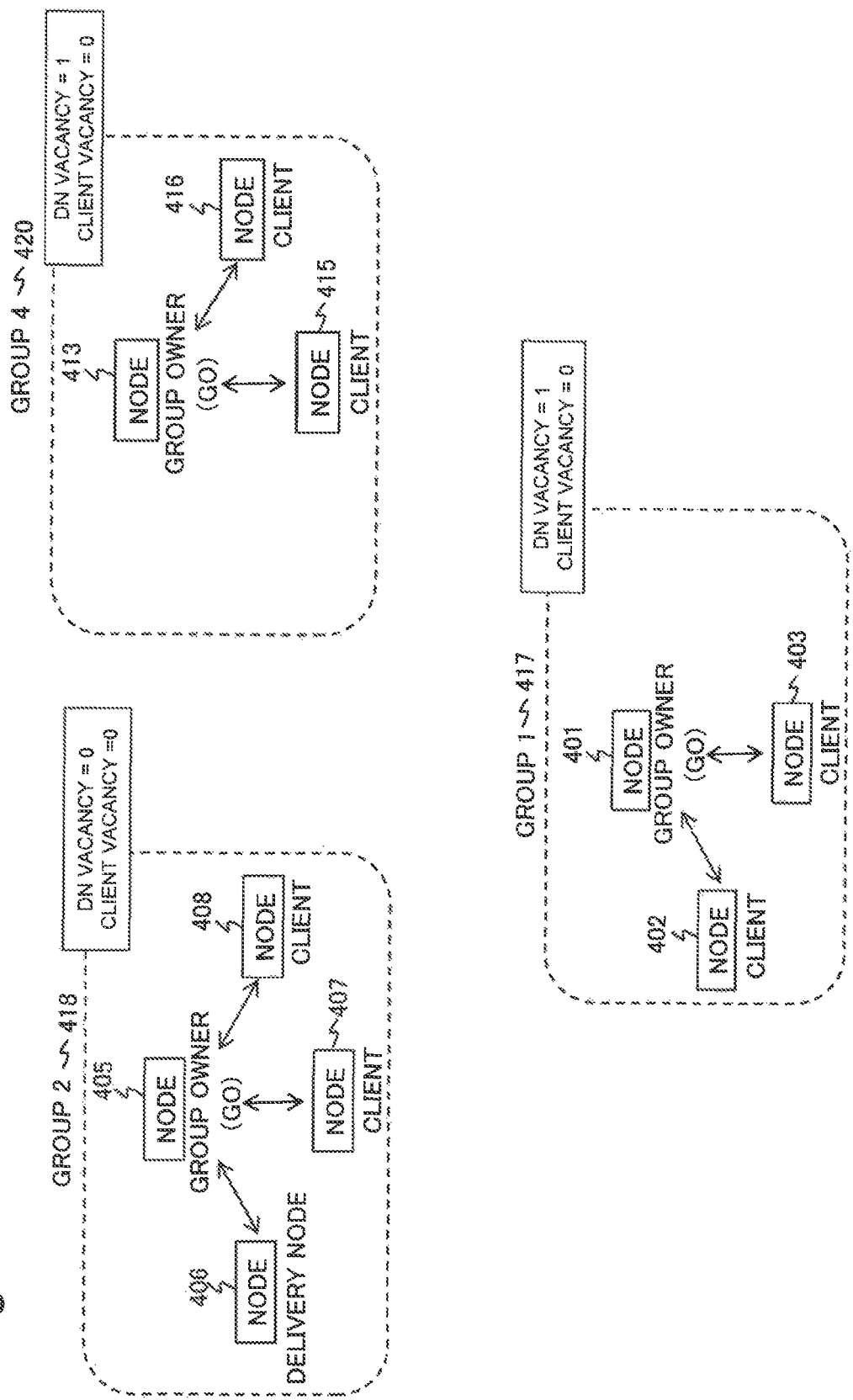
FIG. 11 is a schematic diagram showing a mechanism of initiating switching mechanism according to the exemplary embodiment of the present invention.

FIG. 11 shows a schematic for initiating DN-enabled-connection between a pair of Wi-Fi P2P groups. If two groups with non-zero DN vacancy find each other which do not have an existing DN-enabled-connection, they send a Delivery Node to the other group or expect the same. Specifically, either the first group sends a Delivery Node to the second group, or waits (expects) for a Delivery Node from the second group, thus the delivery node can be sent both way. In FIG. 11, the Group 4 announces one vacancy in Delivery Node category. Also, the Group 1 announces one vacancy in Delivery Node category. The Group 1 and Group 4 do not have an existing DN-enabled-connection.

Figure 12:
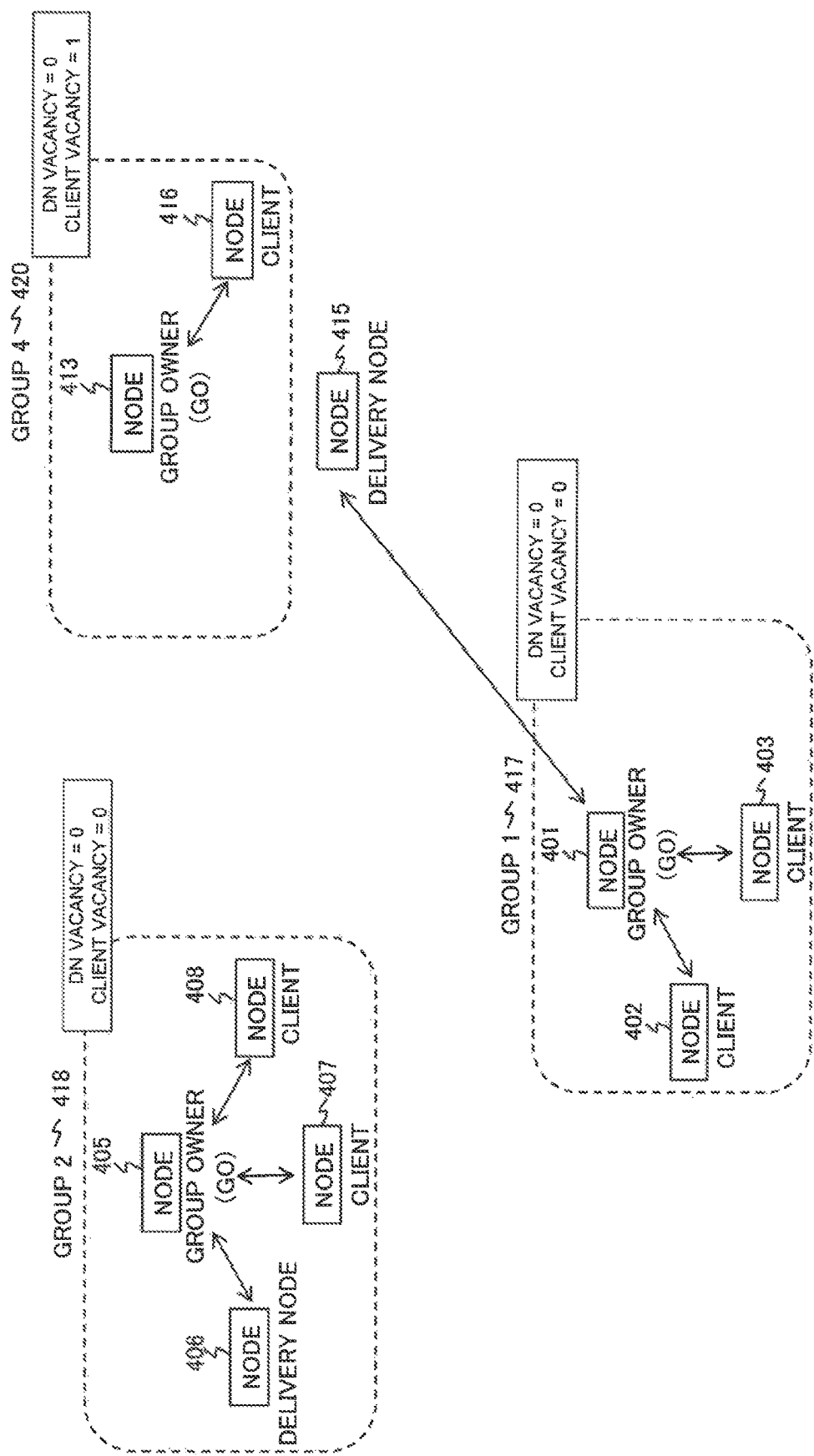
FIG. 12 is a schematic diagram showing a mechanism of initiating switching mechanism according to the exemplary embodiment of the present invention.

FIG. 12 shows a schematic of the method of initiating DN-enabled-connection between a pair of Wi-Fi P2P groups in continuation from the previous figure. As shown here, one of the groups sends a Delivery Node to the other group. Both the groups update their vacancy information accordingly. For example, in FIG. 12, a client node 415 of Group 4 is converted to Delivery Node. As a result, a vacancy in client position (client category) is created while DN vacancy is reduced by one. Here, at the same time, the DN vacancy of Group 1 may be also reduced by one.

Figure 13:
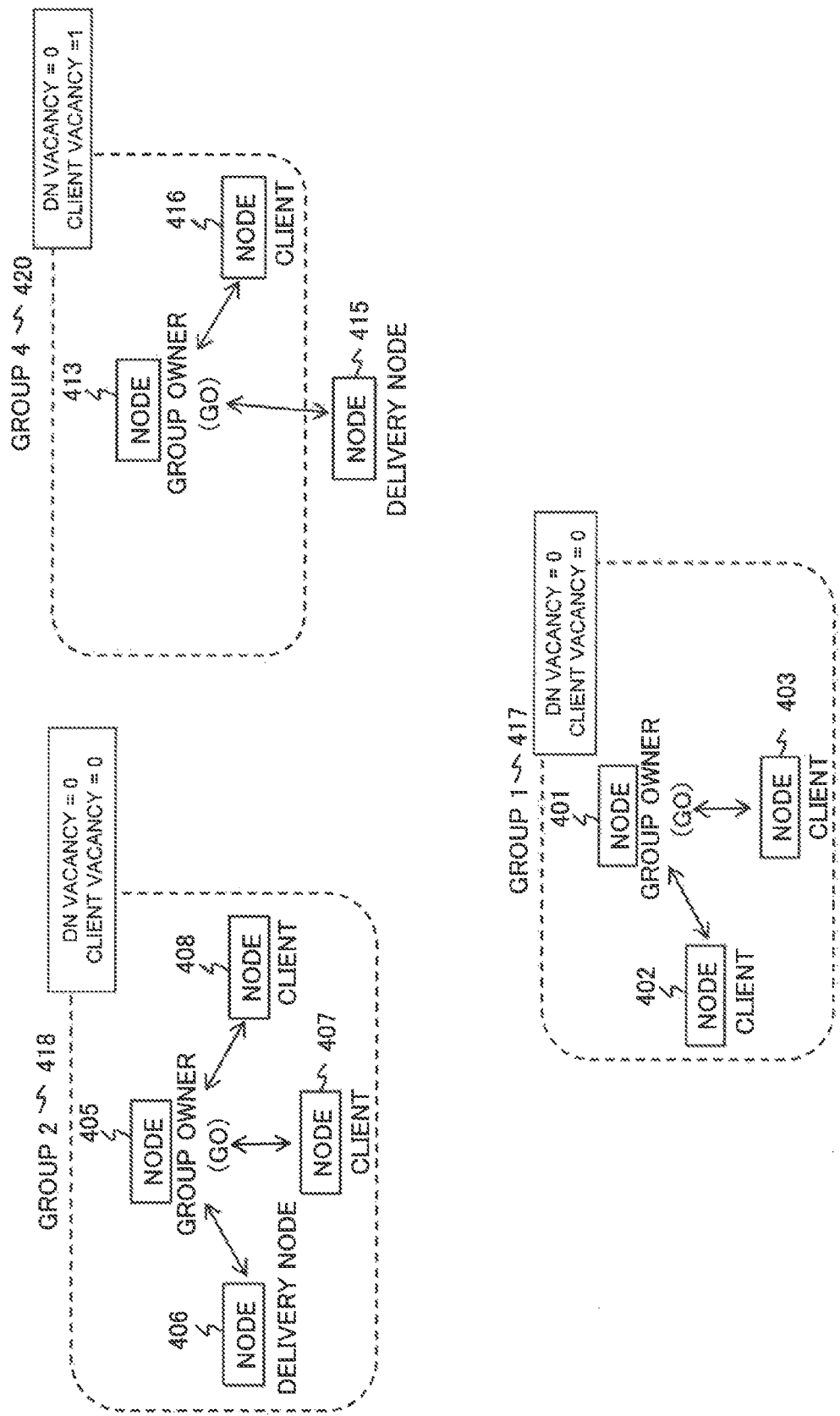
FIG. 13 is a schematic diagram showing a mechanism of initiating switching mechanism according to the exemplary embodiment of the present invention.

FIG. 13 shows a schematic of the method of DN-enabled-connection between a pair of Wi-Fi P2P groups in continuation from the previous figure. As shown in FIG. 13, the designated Delivery Node 415 switches back to its parent Group 4 as a part of the switching activity. For example, in FIG. 13, the DN vacancy is still zero. Thus, the designated Delivery Node 415 temporarily switches to Group 4, but the Delivery Node 415 is still a delivery node (switching node) between Group 1 and Group 4.

Figure 14:
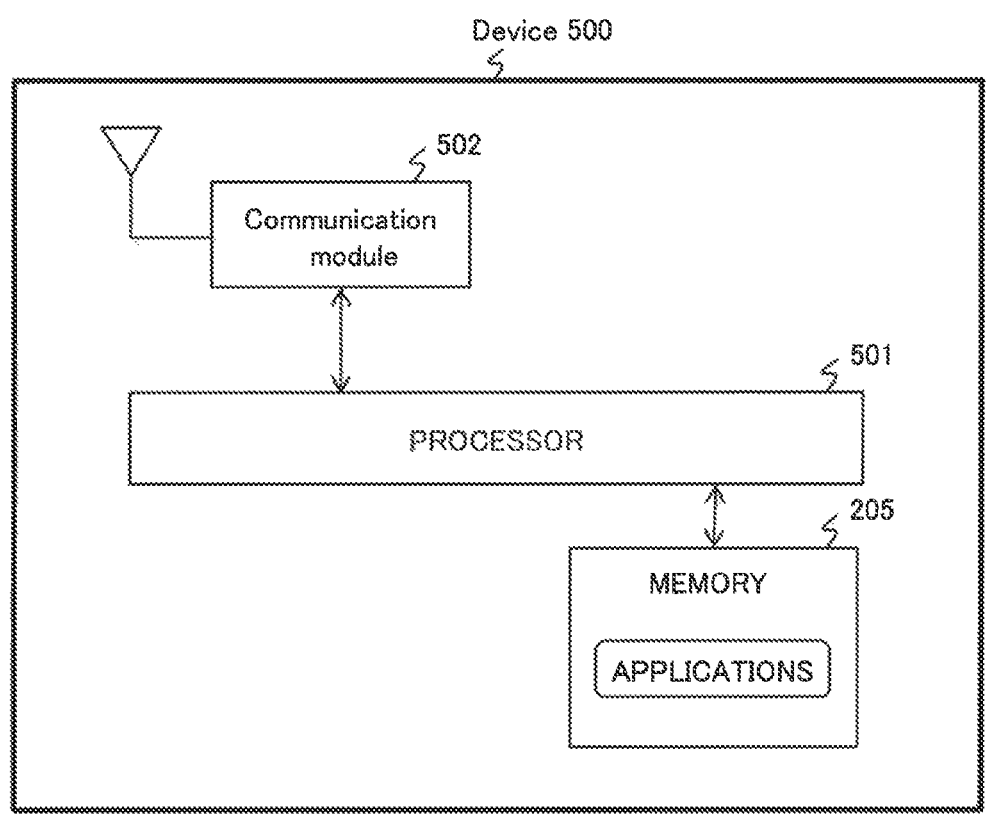
FIG. 14 is a schematic diagram showing a device used to perform communications among at least two Peer to Peer groups according to one or more embodiments of the present disclosure.

FIG. 14 shows a schematic block diagram of a device used to perform communications among at least two Peer to Peer groups according to one or more embodiments of the present disclosure. In various implementations, the devices may comprise personal computing devices (e.g., smart phones, computing tablets, personal computers, laptops, Personal Digital Assistants (PDAs), etc.) capable of communicating using Peer to Peer communication. In FIG. 14, a device 500 includes a processor 501 configured to disconnect from a first owner device in the first Peer to Peer (P2P) group on the basis of a switching schedule prepared by an owner device, to connect with a second owner device in a second P2P group on the basis of the switching schedule, and sharing an information with the second P2P group. The device 500 also includes a communication module 502 configured to perform communications among the first P2P group and the second P2P group on the basis of the information.

The device 500 may include a memory 205 shown in FIG. 2. The memory may include a system memory component (e.g., Random-Access Memory (RAM)), a static storage component (e.g., Read-Only Memory (ROM)), and/or a disk drive. The device 500 performs specific operations by processor 501 and other components by executing one or more sequences of instructions contained in the system memory component. Logic may be encoded in a computer readable medium, which may refer to any medium that participates in providing instructions to processor 501 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component, and transmission media includes coaxial cables, copper wire, and fiber optics, including wires that comprise bus. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, Compact Disc (CD) ROM, any other optical medium, punch cards, paper tape, any other physical medium with patterns of holes, RAM, Programmable ROM (PROM), Electrically Erasable Programmable ROM (EEPROM), FLASH-EEPROM, any other memory chip or cartridge, or any other medium from which a computer is adapted to read.

Where applicable, various embodiments provided by the present disclosure may be implemented using hardware, software, or combinations of hardware and software. Also where applicable, the various hardware components and/or software components set forth herein may be combined into composite components comprising software, hardware, and/ or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Application software in accordance with the present disclosure, such as computer programs executed by the device and may be stored on one or more computer readable mediums. It is also contemplated that the steps identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although embodiments of the present disclosure have been described, these embodiments illustrate but do not limit the disclosure. For example, the word "device" may define Group Owner, Client, or P2P device connectable to a group but not connected to any group. For example, regarding thresholds shown in FIG. 9, thresholds of the switching frequency can be same as or different from thresholds of the number of Delivery Nodes. For example, a switching schedule enables the switching device (Delivery Node) to disconnect from a P2P Group Owner and to connect with other P2P Group Owner to accomplish the novel Wi-Fi Direct communication method as discussed herein.

It should also be understood that embodiments of the present disclosure should not be limited to these embodiments but that numerous modifications and variations may be made by one of ordinary skill in the art in accordance with the principles of the present disclosure and be included within the spirit and scope of the present disclosure as hereinafter claimed.

The above exemplary embodiments can be applied to wireless peer-to-peer (P2P) networks.

REFERENCE SIGNS LIST

101-106 Node
201 Radio system
202 User controller
203 Switching Schedule
204 Processor
205 Memory

The invention claimed is:

1. A method comprising:
performing a scan to discover at least one Peer to Peer (P2P) group;
sharing a result of the scan within a first P2P group;
preparing a switching schedule of the first P2P group based on the shared result; wherein the switching schedule enables a switching device to disconnect from a first owner device in the first P2P group and to connect with a second owner device in a second P2P group;
sharing an information with the second P2P group by using the switching device; and
performing communication among the first P2P group and the second P2P group on the basis of the information.

2. The method according to claim 1, wherein the scan is performed by scanning at least one of channels by at least one device of first P2P group.

3. The method according to claim 1, wherein the information comprises at least one of:
a list of the at least one P2P group discovered by the scan;
a list of at least one device included in the at least one P2P group;
the switching schedule of the first P2P group; and
information collected from the at least one P2P group discovered by the scan.

4. The method according to claim 1, wherein the switching schedule includes at least one of:
identification information to identify the switching device,
destination information of the second P2P group to which the switching device switches from the first P2P group,
a departure time at which the switching device leaves from the first P2P group,
an arrival time at which the switching device comes back to the first P2P group; and
the number of times switching happens in per unit time.

5. The method according to claim 1, wherein the first owner device varies the number of switching devices which switches from the first owner device to the second owner device on the basis of a variation in traffic load between the first P2P group and the second P2P group.

6. The method according to claim 5, wherein the number of the switching devices to perform switching between the first P2P group and the second P2P group increases when the traffic load between the first P2P group and the second P2P group exceeds a first predetermined threshold, and
wherein the number of the switching devices reduces when the traffic load between first P2P group and the second P2P group is less than or equal to the first predetermined threshold.

7. The method according to claim 1, wherein the first owner device varies the number of times that the switching device switches between the first owner device and the second owner device in per unit interval of time on the basis of a variation in traffic load between the first P2P group and the second P2P group.

8. The method according to claim 7, wherein the first owner device increases the number of the times that the switching device switches between the first owner device and the second owner device in per unit interval of time when the traffic load between the first P2P group and the second P2P group exceeds a second predetermined threshold, and
wherein the first owner device decreases the number of times that the switching device switches between the first owner device and the second owner device in per unit interval of time when the traffic load between the first P2P group and the second P2P group is less or equal to the second predetermined threshold.

9. The method according to claim 1, wherein the information comprises at least one of:
security credential of at least one device in the first P2P group,
the switching schedule of the first P2P group,
at least one operating channel used by the at least one device, and
MAC address of the at least one device.

10. The method according to claim 1, wherein the switching device collects, from the second P2P group, information which includes at least one of:
security credential of at least one device,
switching schedule of at least one P2P group; and
at least one operating channel used by the at least one device, wherein the switching device shares the collected information within the first P2P group after the switching device comes back to the first P2P group.

11. The method according to claim 1, wherein, the switching device connects to the second owner device by using a security credential which the switching device has previously used or known to connect with the second owner device.

12. The method according to claim 1, wherein the first owner device stores a security credential of a P2P device of the at least one P2P group, and
wherein the stored security credential allows the P2P device to connect with the first owner device in a P2P invitation procedure.

13. The method according to claim 1, the first owner device selects the switching device from one or more clients of the first P2P group based on at least one of:
  a device type,
  a device capability,
  a transmission range,
  a received signal strength from the second owner device,
  a primary memory size,
  a processing speed,
  a residual power, and
  an expected duration to stay in the first P2P group.

14. The method according to claim 1, the first owner device selects a backup switching device to take over a switching task of the switching device when the switching device quits the switching task.

15. The method according to claim 1, wherein the second owner device switches operating channel of the second P2P group to a less congested channel after receiving operating channel information of first P2P group from the switching device switching between the first P2P group and the second P2P group.

16. The method according to claim 1, wherein the switching device includes group identification information in a Probe Request or a Probe Response while switching to second P2P group.

17. A first owner device in a first Peer to Peer (P2P) group comprising:
  a switching schedule that enables a switching device to disconnect from the first owner device and to connect with a second owner device in a second P2P group;
  a processor that shares a result of a scan which is performed to discover at least one P2P group within the first P2P group, and prepare the switching schedule of the first P2P group based on the shared result.

18. A switching device comprising:
  a processor that disconnects from a first owner device in the first Peer to Peer (P2P) group and connect with a second owner device in a second P2P group on the basis of a switching schedule prepared by the first owner device, wherein the processor shares an information with the second P2P group;
  a communication module that performs communications among the first P2P group and the second P2P group on the basis of the information.

19. A non-transitory computer readable medium embodying instructions for controlling a device to implement a method comprising:
  disconnecting from a first owner device in a first Peer to Peer (P2P) group on the basis of a switching schedule prepared by the first owner device;
  connecting with a second owner device in a second P2P group on the basis of the switching schedule;
  sharing an information with the second P2P group; and
  performing communications among the first P2P group and the second P2P group on the basis of the information.

* * * * *